FIG. 1

INVENTORS
ROBERT F. VUILLEUMIER
DAVID W. MOORE
BY
AGENT

FIG. 2

SENSOR
FIG. 3

SENSOR
FIG. 4

FIG. 6

INVENTORS
ROBERT F. VUILLEUMIER
DAVID W. MOORE
BY

*Richard P. Alberi*

AGENT

FIG. 7

3,253,588
BIO-INSTRUMENTATION APPARATUS
Robert F. Vuilleumier, Manhattan Beach, and David W. Moore, Santa Barbara, Calif., assignors, by mesne assignments, to Lear Siegler, Inc., Santa Monica, Calif., a corporation of Delaware
Filed Feb. 1, 1962, Ser. No. 170,315
5 Claims. (Cl. 128—2)

This invention relates to bio-instrumentation and more particularly to instrumentation for sensing physiological reactions of a man, and for wireless transmission of the information gained to a nearby receiver.

With the present state of the art, it is desirable to study the physiological reaction of a man under certain conditions. This is especially important in the case of astronauts during flights of space vehicles. At the present time, the astronaut's physiological reactions are detected by sensors on his body. Each of the sensors is wired to the space suit which he wears, and the suit, in turn, is wired by way of an "umbilical cord" to a box which may be a recorder or transmitter. The disadvantage of such a system is that the man does not have freedom of movement since the wires are attached to the sensors on his body and his suit is attached to a recorder. Whenever the man wishes to move he must be careful not to dislodge any of the wires attached to the sensors, and he must further pick up the recorder box and carry it with him. The wires cause skin irritation as well as restrict movement. The wires also carry electrical power and, therefore, the man is subject to an electrical shock should any of the wires become bared.

Still another disadvantage of the present state of the art system, is that in order to check out the sensors in preflight, the man must put the space suit on to complete the connection and assure that the system is functioning properly.

In general, the present invention utilizes small single channel microsensors (also referred to hereinafter simply as "sensors") containing suitable electrodes or transducers capable of picking up low-level signals from the human body, or of converting physiological reactions to such signals. In the case of inflight monitoring, the microsensors are taped to the pilot's body. Each of the microsensors transmits a physiological data signal at a given frequency $f_0$ (FIG. 2), on command to a receiver located in a remote portion of the cabin. At that point, the signals are recorded or retransmitted to ground receiving stations. Power for the microsensors is supplied by electromagnetic induction of corresponding interrogating signals generated by an external transmitter at frequencies $f_1$ through $f_{12}$ (when 12 microsensors are used). The absence of conventional power and the use of microcircuitry make it possible to incorporate the sensor circuitry in packages of extremely small size.

It is, therefore, an object of the present invention to provide a bio-instrumentation system which is simple in design and allows freedom of movement of the instrumented subject.

Another object of the present invention is to provide a simplified-bio-instrumentation system which is reliable and functions with a minimum of electrical noise.

Still another object of the present invention is to provide a simplified-bio-instrumentation system which has no lead wires on the instrumented subject and no "umbilical cord" to the receiver or recorder.

Other objects and advantages of the present invention will become apparent from the following description when taken in conjunction with the drawings in which.

Figure 1:
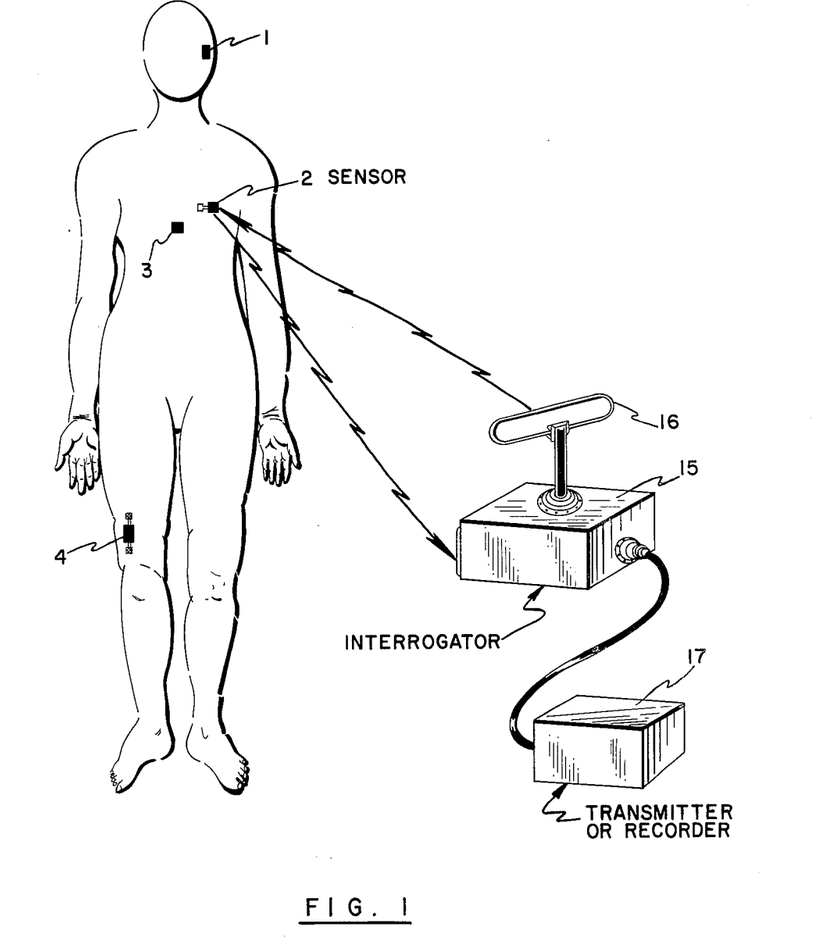
FIG. 1 is a partial plan and partial perspective view of the present invention.

Referring to FIG. 1 which illustrates a typical system of the invention, the sensors 1 through 12 are located on the human body. It is to be noted that two or more sensors may be used with the present invention. Four sensors are shown in FIG. 1, however, twelve sensors are used in the description of the present invention. An inerrogator unit 15 first transmits an electrical signal by way of antenna 16 to a sensor (sensor 2 for example) and this signal provides the power for the sensor to transmit an electrical signal back to a receiver in the interrogator unit 15. The signal received by the receiver is then amplified and fed to unit 17, which can be a transmitter for transmitting electrical signals to a ground station, or a recorder, or both.

Figure 2:
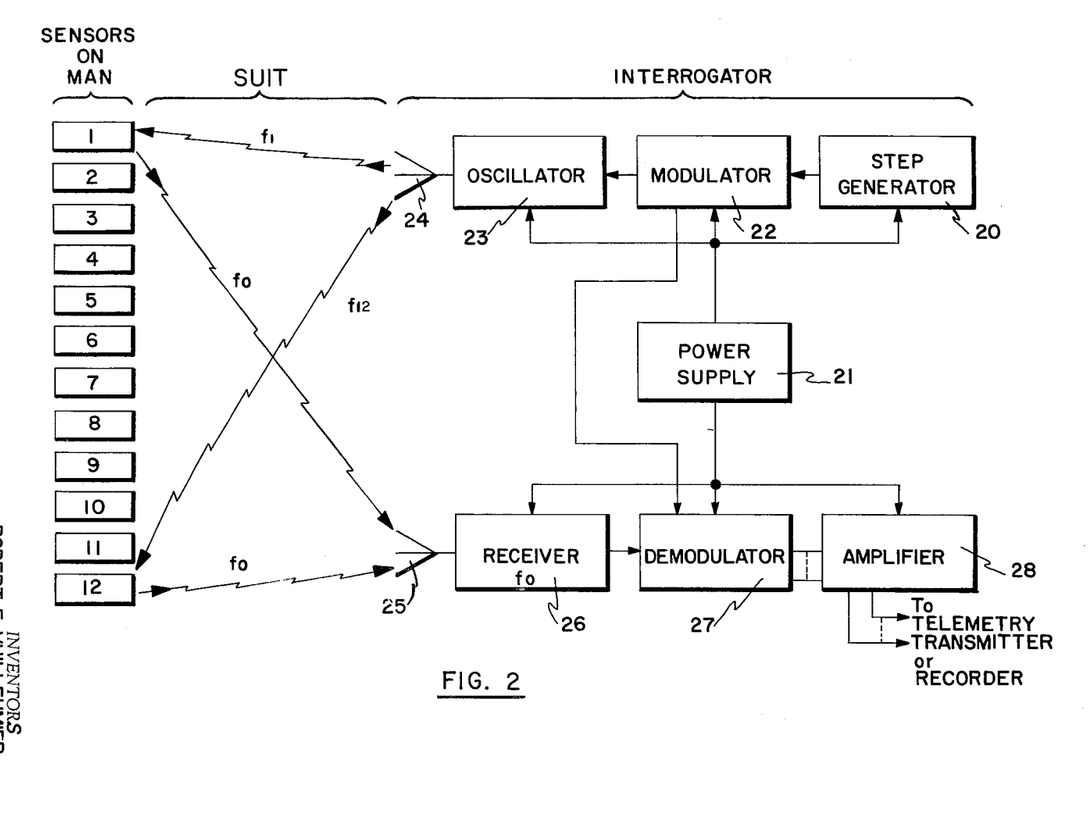
FIG. 2 is a block diagram of the present invention.

Referring now to FIG. 2, the bracketed portion designated "interrogator" corresponds to unit 15 and antenna 16 of FIG. 1. The sensors are shown in block form and numbered 1 through 12. Power supply 21 supplies power to step generator 20, modulator 22, oscillator 23, receiver 26, demodulator 27 and amplifier 28. Step generator 20 generates a staircase signal, which is applied to modulator 22. Oscillator 23, in response to the output from modulator 22, transmits electrical signals through antenna 24 at frequencies $f_1$ through $f_{12}$, which, as will be seen, are received by corresponding microsensors. Twelve frequencies are used in this example, one for each of the twelve sensors employed. The receiver in each sensor is tuned to receive signals at a given individual frequency different from the frequencies to which the other sensors are tuned. Receiving antenna 25 is electrically connected to the input of receiver 26. Demodulator 27 is electrically connected to the output of receiver 26. Amplifier 28 is electrically connected to the output of the demodulator 27. Although amplifier 28 is represented in the diagram as a single unit, in actuality, an individual amplifying circuit is employed for each sensor. Therefore, in the case where twelve sensors are used, twelve amplifying circuits are employed. As will be described below in detail, the antenna 25 receives signals from the sensors on a single frequency, but since the sensors transmit only when they have received power from the oscillator 23, the antenna 25 at any given time only picks up a signal from one sensor. The demodulator 27 is electrically connected to the modulator 22 which provides a synchronizing pulse so that the demodulator 27 can determine which sensor is sending the signal at a given time to the receiver 26 by way of antenna 25.

*Description of typical sensor*

Figure 3:
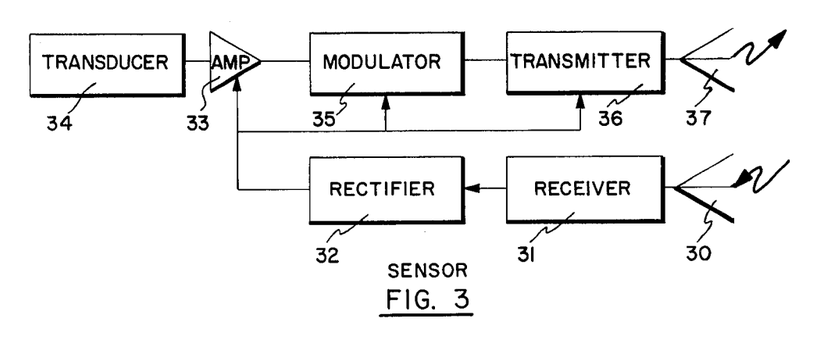
FIG. 3 is a block diagram of one of the sensors of the present invention.
Figure 4:
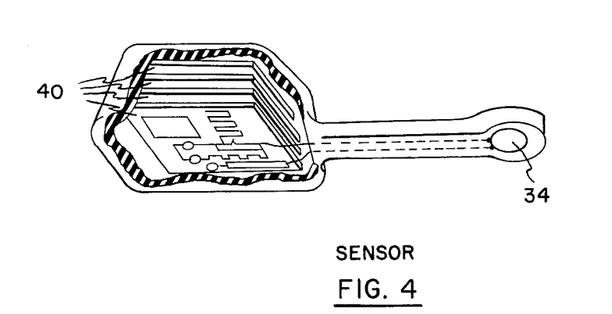
FIG. 4 is a perspective view of a typical sensor of the present invention.

As indicated in FIG. 3, an antenna 30 receives electrical signals from oscillator 23 via antenna 24 (FIG. 2), and transmits them to receiver 31. Rectifier 32 has an electrical output to amplifier 33, modulator 35 and transmitter 36. Transducer 34 has an electrical output to amplifier 33. Modulator 35 receives the output from amplifier 33 and provides an output to transmitter 36 which is electrically connected to transmitting antenna 37. As will be described in detail below, the receiver 31, through antenna 30 receives one of the frequencies $f_1$ through $f_{12}$ to which the receiver is tuned. For example, receiver 31 can be programmed to receive signals at the frequency $f_{12}$. When an electrical signal of frequency $f_{12}$ is generated by oscillator 23, the receiver 31 picks up the signal, and feeds it to rectifier 32 where it is rectified and the rectified signal fed to amplifier 33, modulator 35, and transmitter 36 as a direct current power signal. The transducer 34 detects and provides data on physiological reactions of the man as for example, respiration data, skin temperature, EKG, GSR, etc. and provides an output signal. Such signal is amplified by amplifier 33 and the amplified signal fed to modulator 35, which modulates the transmitter 36. The modulated signal generated in the transmitter 36 is transmitted by way of antenna 37 to the receiver 26 in the interrogator unit 15 (FIGS. 1 and 2). A typical sensor is shown in FIG. 4 wherein the actual transducer unit 34 is located in the handle portion of the unit and electrically connected to the wafers 40 of the sensor, which wafers contain the electrical circuits of the sensor. The transducer 34 and wafers 40 are then encased in a suitable material, such as plastic or rubber, for example. The encased transducer can be taped or otherwise secured to the man's body.

Figure 5:
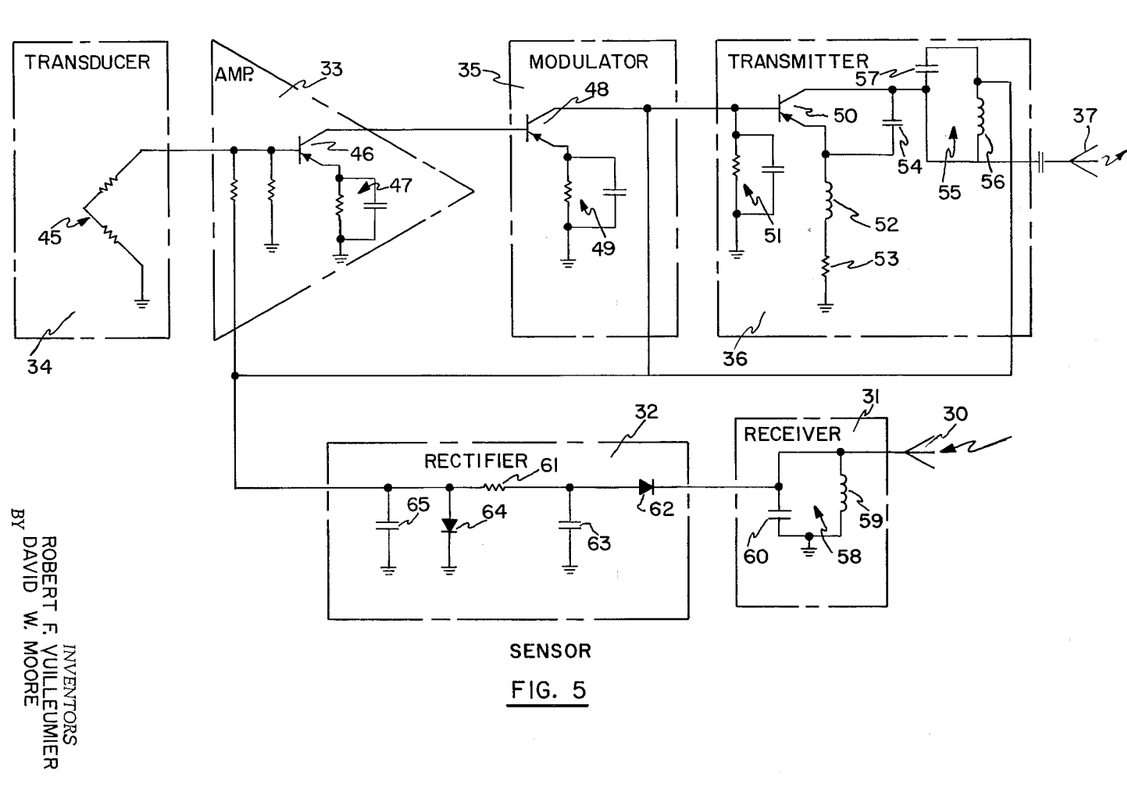
FIG. 5 is a schematic drawing of a typical sensor of the present invention.

FIG. 5 illustrates the circuitry of a typical sensor wherein the transducer 34 constitutes a typical electrical temperature sensing device 45. The output of the transducers 34 is directly connected to the base of the transistor 46 in amplifier 33. The emitter of the transistor 46 is electrically connected to ground by way of resistor-capacitor circuit 47. The collector of transistor 46 provides the output of amplifier 33 and is electrically connected to the base of transistor 48 in frequency modulator 35. The emitter of transistor 48 is electrically connected to ground by way of resistor-capacitor circuit 49. The collector of transistor 48 provides the output of frequency modulator 35 which is fed to the base of transistor 50 in transmitter 36. The base of transistor 50 is electrically connected to ground by way of resistor-capacitor circuit 51. The emitter of transistor 50 is electrically connected to ground by way of coil 52 and resistor 53. The emitter of transistor 50 is also electrically connected to the collector of transistor 50 by way of capacitor 54. The collector of transistor 50 is connected to the resonant circuit 55 comprised of the coil 56 and capacitor 57. Transmitting antenna 37 is electrically connected through a capacitor to the resonant circuit 55, between the coil 56 and capacitor 57. Receiving antenna 30 is electrically connected to the tuned resonant circuit 58 of receiver 31. The tuned resonant circuit comprises a coil 59 and a capacitor 60. The output from the resonant circuit 58 of the receiver 31 is electrically connected to the first terminal of resistor 61 of rectifier 32 by way of diode 62 and is also electrically connected to one side of capacitor 63 by way of diode 62. The other side of capacitor 63 is electrically connected to ground. The second terminal of resistor 61 is electrically connected to ground through zener diode 64. Capacitor 65 is connected between the second terminal of resistor 61 and ground, in parallel with diode 64. The second terminal of resistor 61 is also electrically connected through a resistor to the base of transistor 46 in amplifier 33, to the collector of transistor 48 in modulator 35, and to a point in the resonant circuit 55 in transmitter 36 which point is intermediate the capacitor 57 and coil 56 on the side of the resonant circuit 55 opposite to the side to which the collector of transistor 50 is connected.

*Operation of the sensor*

The resonant circuit 58 (FIG. 5) is tuned to one of the twelve frequencies, $f_{12}$ for example. The radio signal of the frequency to which the sensor is tuned is fed by the receiving antenna 30 to the resonant circuit 58. The output from the resonant circuit is rectified by diode 62, filtered by capacitors 63 and 65, resistor 61, and zener diode 64. The output of rectifier 32 is, therefore, a direct current voltage to supply power to the amplifier 33, modulator 35, and transmitter 36. It is to be noted that such power is supplied only when the antenna 30 picks up the signal on the frequency to which the resonant circuit 58 is tuned. When power is supplied to amplifier 33, the electrical signal from the transducer 34 is amplified in amplifier 33. The amplified signal is used to modulate the transmitter 36 by means of modulator 35. The modulated signal from the transmitter is transmitted by way of antenna 37.

*Description of a typical modulator and step generator*

Figure 6:
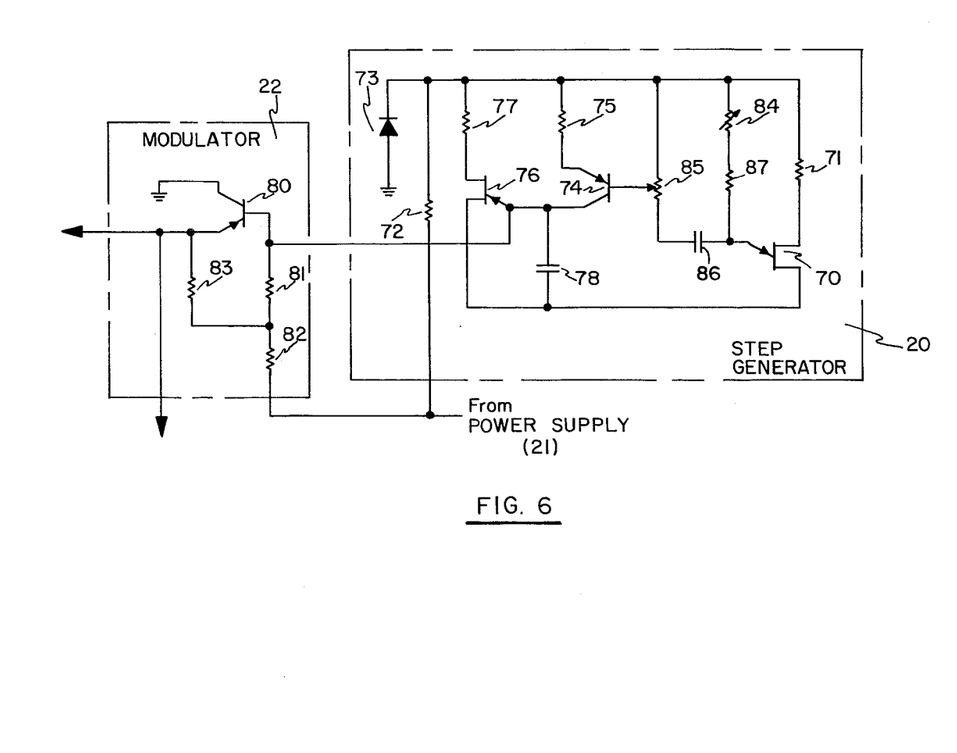
FIG. 6 is a schematic drawing of the modulator and step generator of the present invention.

In FIG. 6, the step generator 20 receives power from the power supply 21. The base of unijunction transistor 70 is electrically connected to the power supply by way of resistors 71 and 72. The emitter of unijunction transistor 70 is connected to the power supply through capacitor 86, resistor 85 and resistor 72. Variable resistor 84 and resistor 87 are connected in series between resistor 72 and the emitter to unijunction transistor 70. The power supply is also electrically connected to ground by way of zener diode 73. Zener diode functions as a voltage regulation device for the step generator 20. Transistor 74 has its emitter electrically connected to the power supply by way of resistors 75 and resistor 72. The base of unijunction transistor 76 is electrically connected by way of resistors 72 and 77 to the power supply. One terminal of capacitor 78 is connected to the emitter of unijunction transistor 76 and the collector of transistor 74. The other terminal of capacitor 78 is connected to the bases of unijunction transistors 70 and 76.

The base of transistor 80 in modulator 22 is electrically connected to the output of the step generator 20, which comes from a common junction between the emitter of unijunction transistor 76 and collector of transistor 74. The base of transistor 80 is also electrically connected to the power supply by way of resistors 81 and 82. The collector of transistor 80 is electrically connected to ground. The emitter of transistor 80 is electrically connected to the base of transistor 80 by way of resistors 83 and 81. The output of the modulator 22 is taken from the emitter of transistor 80. This output leads to oscillator 23 and to demodulator 27.

The unijunction transistor 70 operates as a free-running oscillator which generates negative pulses. These pulses charge the capacitor 78 in steps. When the voltage across capacitor 78 reaches a peak-to-peak voltage of transistor 80, the transistor 80 conducts and discharges capacitor 78. Variable resistor 84 in step generator 20 determines the frequency of the steps while the resistor 85 of step generator 20 determines the number of steps per cycle. The staircase signal generated is applied to a free-running multivibrator, which is the oscillator 23 (FIG. 7) described below.

*Description of oscillator 23*

Figure 7:
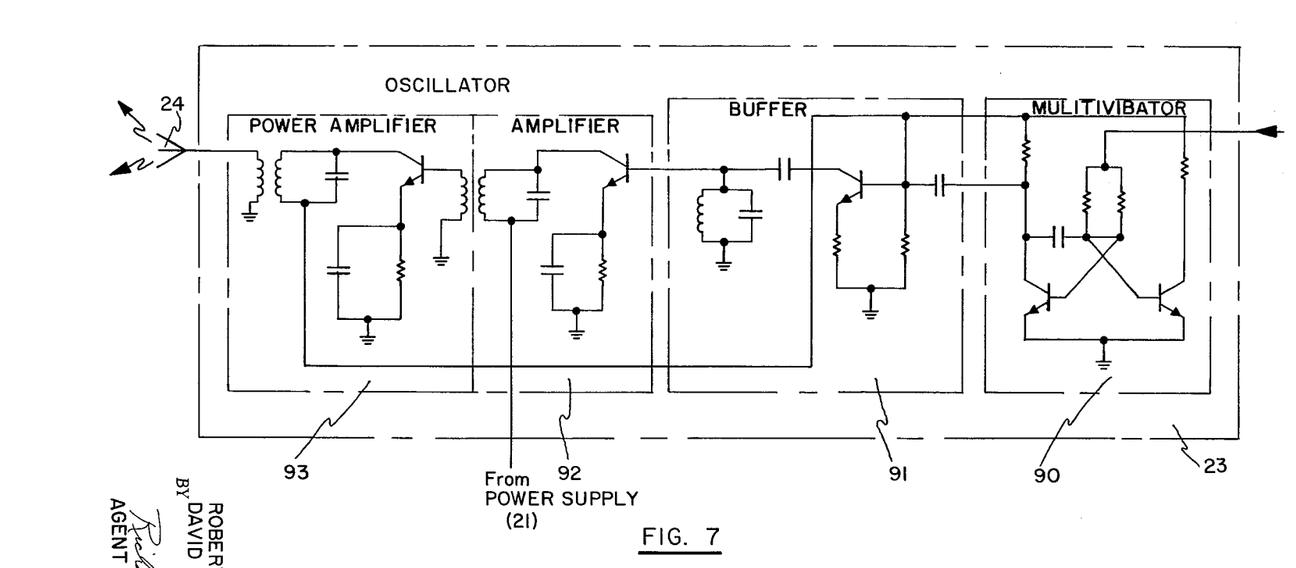
FIG. 7 is a schematic drawing of the oscillator of the present invention.

The first stage of the oscillator 23 in FIG. 7 is a multivibrator 90. This is then followed by the second buffer stage 91. The third stage of the oscillator 23 is amplifier 92, and the fourth stage is the power amplifier 93. The circuits of the oscillator 23 are standard multivibrator, buffer, amplifier, and power amplifier circuits. The frequency of the multivibrator 90 changes in steps $(f_1-f_{12})$, as determined by the staircase signal from the modulator 22. These frequencies are then amplified successively in the buffer stage 91, the amplifier stage 92, and the power amplifier stage 93. The signals are then radiated through the antenna 24.

*Description of demodulator 27*

Figure 8:
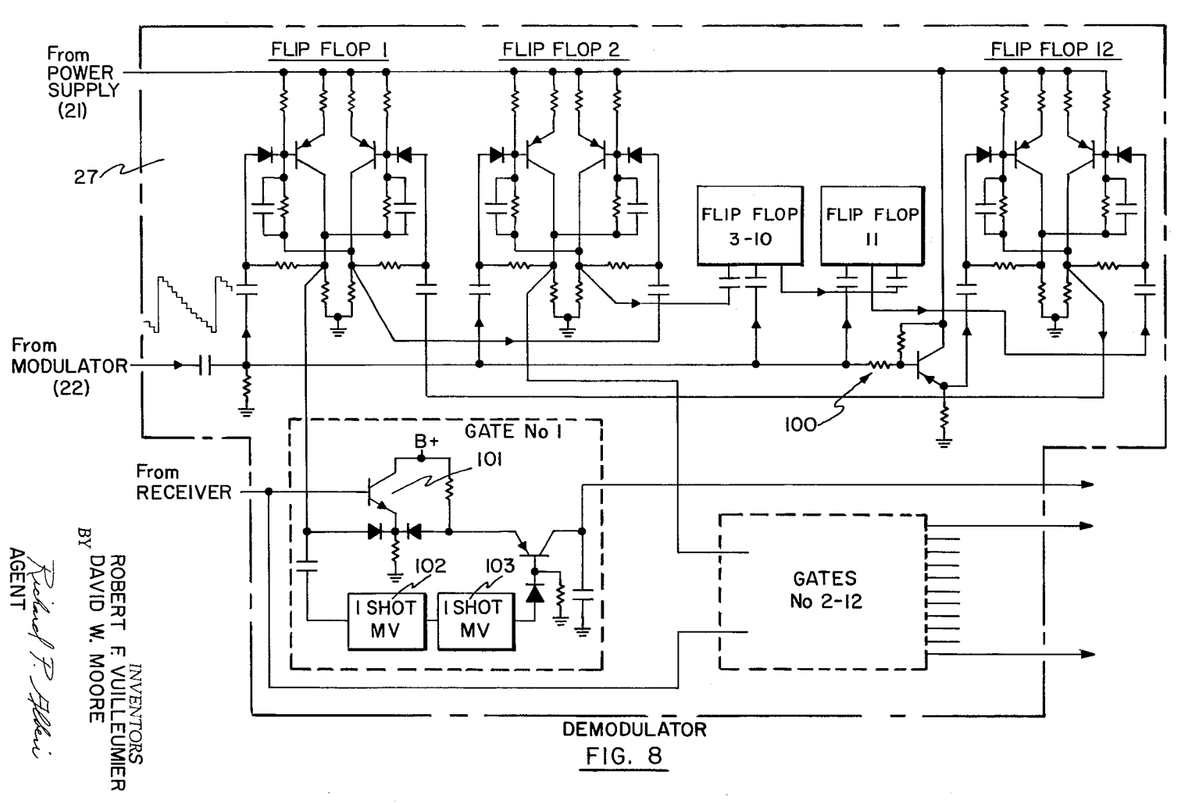
FIG. 8 is a schematic drawing of a typical demodulator of the present invention.

The demodulator 27 shown in FIG. 8 is comprised of the flip-flops 1 through 12. Flip-flops 1 and 2 are shown in detail. Flip-flops 3 through 11 are shown in block form. Flip-flop 12 is also shown in schematic detail. The synchronized pulse, which, in fact, is a clock pulse, comes from the modulator 22 and is electrically connected to flip-flops 1 through 11 by way of a capacitor. However, the same input is electrically connected to flip-flop 12 by way of inverter 100. It is to be noted that one of the outputs of each of the flip-flops is connected to the trigger of each of the successive flip-flops, i.e., the output from flip-flop 1 is the trigger for flip-flop 2, the output of flip-flop 2 is the trigger for flip-flop 3, and so on. The pulses from the staircase signal generator are step pulses; however, the twelfth pulse sensed, goes from a low value to a high value and is a greater pulse in magnitude. Only the larger pulse passes through the inverter 100 to flip-flop 12. The sequence of operation, therefore, is that flip-flop 1 receives the clock pulse and is energized, thereby triggering flip-flop 2 which receives the next clock pulse and is energized, and so on down the line. However, when flip-flop 12 is energized the output of flip-flop 12 is used to trigger flip-flop 1 to start the sequence all over again. The output of the flip-flops is also electrically connected to the gates 1 through 12. Only gate 1 is shown in detail. The gates are in parallel and each one is electrically connected to a corresponding flip-flop. The input from the receiver 26 enters each of the gates by way of the transistor 101, shown in gate 1, and corresponding transistors in the rest of the gates. The two one-shot multivibrators 102 and 103 sample and hold the received information during the time transistor 101 is conducting in order to minimize the interference with the other channels, i.e., the transistor 101 is energized so that it conducts, but the electrical signal is stored in the multivibrators 102 and 103. When the transistor 101 has ceased to be energized, the signal from the second one-shot multivibrator 103, is allowed to pass out of the gate and on to the amplifier 28 (FIG. 2).

It is to be noted that the electrical signals from receiver 26 may be transmitted directly to a recorder or telemetry transmitter rather than being separated into twelve individual signals. This would require that the signals be separated at a later time.

This system, when used with twelve sensors and the typical circuits shown, functions as follows: the sensors are placed on the man, the oscillator generating the frequencies $f_1$–$f_{12}$ energizes each of the sensors sequentially. A sensor then picks up a signal by way of its transducer 34, amplifies it with the power received from the oscillator 23 (FIG. 2) and transmits a signal to the receiver 26. A sensor does not require any external power and transmits information in terms of an electrical signal when the sensor is energized by its receiver 31. The electrical output of the system described herein actually comprises twelve outputs, each one comprising intelligent electrical information corresponding to phenomenon sensed by the transducer 34 in the sensor located on the man. Such a system is simple. It allows the man freedom of movement. It is reliable, comfortable, and reduces the electrial noise as compared with the old system. Furthermore, this system eliminates the umbilical cord and any chance of electrical shock to the man.

It is to be noted that this system can be used to sense reactions of all living species, such as fish, reptiles, birds, and any type of mammals.

Although the invention has been disclosed and described in detail, the same is by way of example only and is not to be taken by way of limitation, the spirit and scope of this invention being limited only by the terms of the appended claims.

We claim:

1. A physiological microsensor comprising in combination:
    (1) transducer means for sensing a predetermined physiological phenomenon and providing an electrical first output signal,
    (2) amplifier means connected to said transducer means to receive and amplify said first output signal and provide an amplified first output signal,
    (3) modulator means connected to said amplifier means for receiving the said amplified first output signal and provide a modulation signal output,
    (4) transmitting antenna,
    (5) transmitter means connected to said modulator means and said transmitting antenna to receive said modulation signal and to transmit a modulated intelligence signal at a first frequency by way of said transmitting antenna, and
    (6) power supply means, including a receiver circuit means, tuned for receiving an interrogating signal at a frequency different from said first frequency and means for converting said interrogating signal into electric power and for feeding said power to said amplifier means, said modulator means and said transmitter means.

2. The microsensor of claim 1 wherein said power supply means comprises a receiving antenna means, wherein said receiver circuit means comprises a selective receiver circuit connected to said receiving antenna means and tuned to receive said interrogating signal from said receiving antenna means, and wherein said converting means comprises a rectifier means connected to said selective receiver circuit to convert said interrogating signal to D.C. power for said amplifier means, said modulator means and said transmitter means.

3. In combination
    (i) the physiological microsensor of claim 1,
    (ii) an interrogating transmitter means positioned remotely from said microsensor for supplying said interrogating signal, and
    (iii) receiver means positioned remotely from said microsensor for receiving said modulated intelligence signal.

4. The combination of claim 3 wherein said interrogating transmitter means comprises means to transmit signals sequentially at different frequencies.

5. A physiological sensing system comprising in combination:
    (A) a plurality of physiological microsensors each comprising,
        (1) transducer means for sensing a predetermined physiological phenomenon and providing an electrical first output signal,
        (2) amplifier means connected to said transducer means to receive and amplify said first output signal and provide an amplified first output signal,
        (3) modulator means connected to said amplifier means for receiving the said amplified first output signal and provide a modulation signal output,
        (4) transmitting antenna,
        (5) transmitter means connected to said modulator means and said transmitting antenna to receive said modulation signal and to transmit a modulated intelligence signal at a first frequency by way of said transmitting antenna, and
        (6) power supply means, including a receiver circuit means tuned for receiving an interrogating signal at a frequency different from said first frequency and different from the frequency of the interrogating signals that any of the other microsensors of said plurality of physiological microsensors are tuned to receive, and including means for converting said interrogating signal into electric power and for feeding said power to said amplifier means, said modulator means and said transmitter means; and
    (B) an interrogating transmitter means positioned remotely from said microsensors for supplying said interrogating signals to said plurality of physiological microsensors sequentially, each such interrogating signal being at a frequency corresponding to the frequency to which the said microsensor being interrogated is tuned, whereby said microsensors are interrogated individually and transmit their modulated intelligence signals individually.

References Cited by the Examiner

UNITED STATES PATENTS

| | | | |
|---|---|---|---|
| 2,409,033 | 10/1946 | Garceau | 128—2.1 |
| 2,511,409 | 6/1950 | Mayberry | 325—8 |
| 2,607,004 | 8/1952 | Harris | 325—8 |
| 2,660,165 | 11/1953 | Miller | 128—2.06 |
| 2,812,428 | 11/1957 | Rath | 325—8 |
| 2,818,732 | 1/1958 | Bennett | 73—362 |
| 2,958,781 | 11/1960 | Marchal | 325—8 |
| 3,018,475 | 1/1962 | Kleist | 325—8 |
| 3,117,277 | 1/1964 | De Magondeaux | 325—6 |

OTHER REFERENCES

Basmajian: IRE Transactions on Medical Electronics, pp. 45–47, July 1958.

Farrar: Science, June 17, 1960, vol. 131, p. 1814.

Essler: Nature, Apr. 1, 1961, pp. 90–91.

RICHARD A. GAUDET, *Primary Examiner.*

JORDAN FRANKLIN, LOUIS PRINCE, *Examiners.*

S. BRODER, *Assistant Examiner.*